United States Patent [19]
Byerley

[11] Patent Number: 6,013,147
[45] Date of Patent: Jan. 11, 2000

[54] EXPANDABLE BELT AND TREAD DRUM

[75] Inventor: Mark S. Byerley, Greenback, Tenn.

[73] Assignee: WYKO, Inc., Greenback, Tenn.

[21] Appl. No.: 09/120,166

[22] Filed: Jul. 21, 1998

[51] Int. Cl.[7] .................................................. B29D 30/24
[52] U.S. Cl. ........................ 156/110.1; 156/417; 156/420
[58] Field of Search .................................... 156/417, 420,
156/415, 418, 110.1, 421.6, 421.8; 249/178,
180, 181

[56] References Cited

U.S. PATENT DOCUMENTS

| | | |
|---|---|---|
| 1,669,532 | 5/1928 | Myers . |
| 2,132,834 | 10/1938 | Stevens et al. . |
| 2,201,469 | 5/1940 | Bostwick . |
| 2,514,215 | 7/1950 | Stevens et al. . |
| 3,485,700 | 12/1969 | Cooper et al. . |
| 3,909,336 | 9/1975 | Takahashi et al. . |
| 4,392,899 | 7/1983 | Bertoldo . |
| 4,923,554 | 5/1990 | Ozawa . |
| 5,354,405 | 10/1994 | Byerly . |
| 5,460,685 | 10/1995 | Siegenthaler . |

Primary Examiner—Geoffrey L. Knable
Attorney, Agent, or Firm—Pitts & Brittian, PC

[57] ABSTRACT

A belt and tread drum having an annular shell comprising a plurality of circumferentially spaced segments, each of which is mounted on a carrier which disposed in circumscribing relationship to a generally cylindrical actuator rotatably connected with a reciprocating piston disposed within a cavity defined between the actuator and a hub fixed to a central core of the drum. Translational movement of the piston between extended and retracted positions in a direction parallel to the rotational axis of the drum is converted into selected rotational movement of the actuator relative to the hub. A plurality of sets of links interposed between the segments and the actuator and hub have their first ends commonly pivotally pinned to a segment. The second end of one link of each set of links is pivotally pinned to the actuator and the second end of the other link of each set of links is pivotally pinned to the hub. Rotation of the actuator relative to the hub controls the arcuate separation of these second ends such that bringing these second ends toward contiguity moves the segments radially outwardly, and conversely, moving these second ends arcuately apart serves to move the segments radially inwardly of the drum. A hand wheel establishes maximum and minimum rotational movement of the actuator and provides a visual indication of the radial positions of the several segments, i.e. the diameter of the drum.

12 Claims, 14 Drawing Sheets

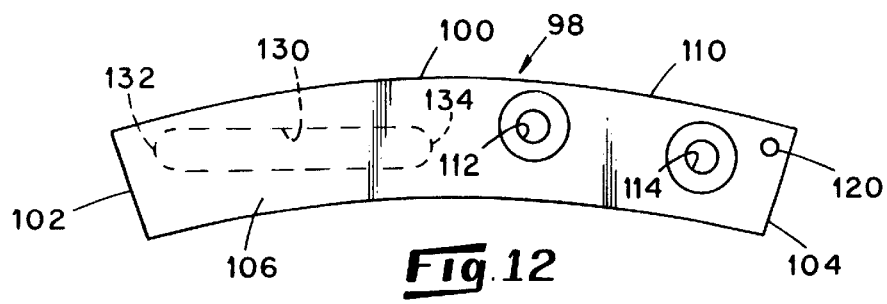
*Fig.12*
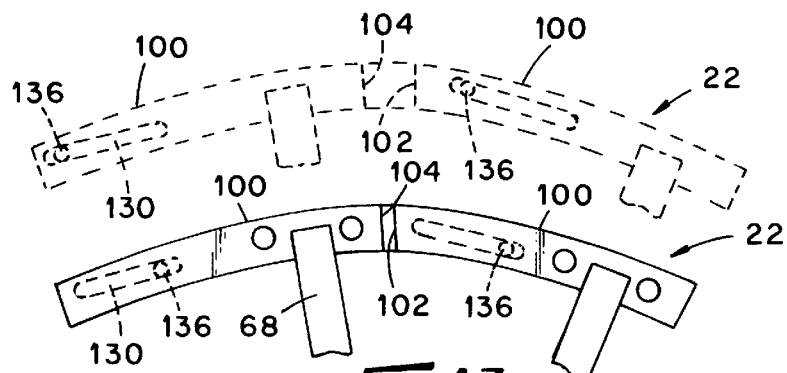
*Fig.13*
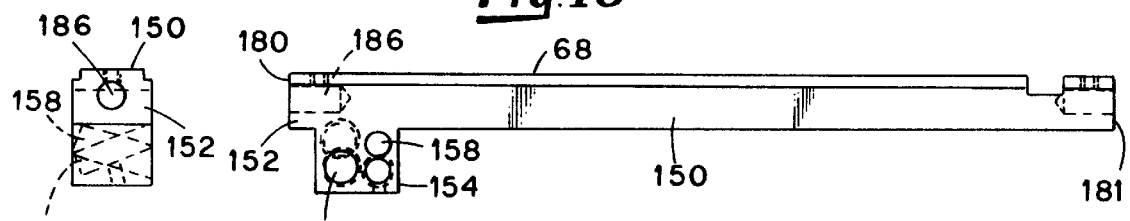
*Fig.15*  *Fig.14*
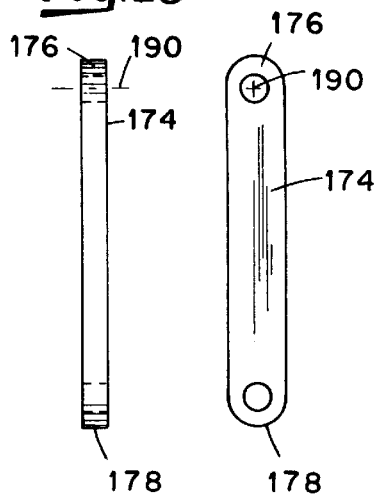
*Fig.16*  *Fig.17*
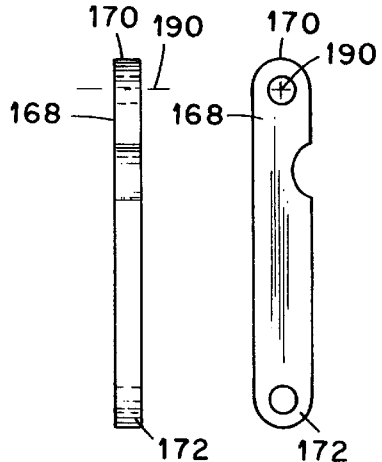
*Fig.18*  *Fig.19*

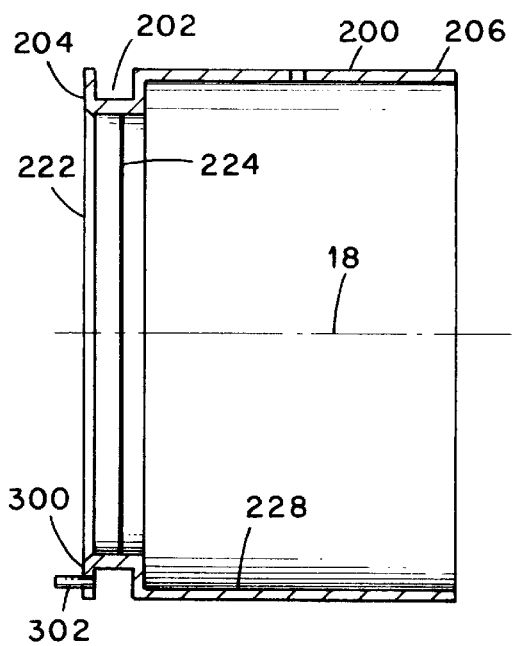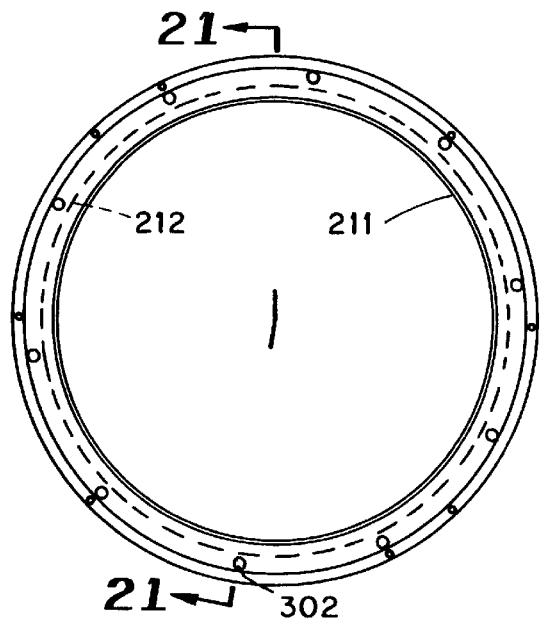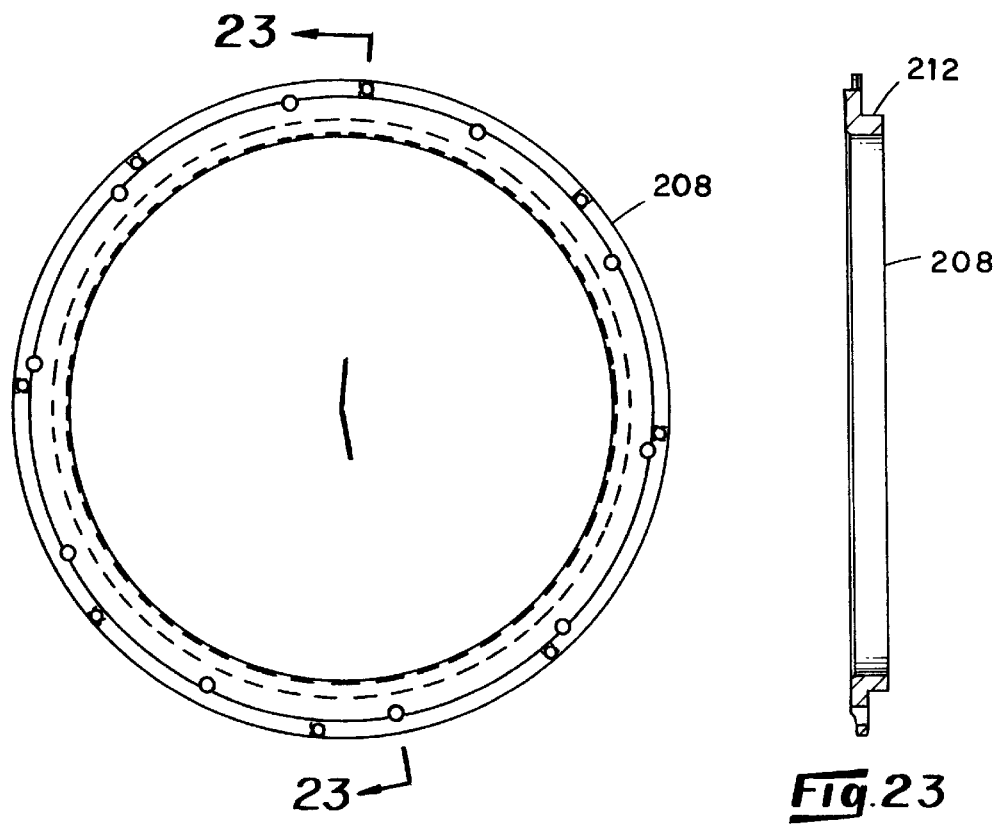

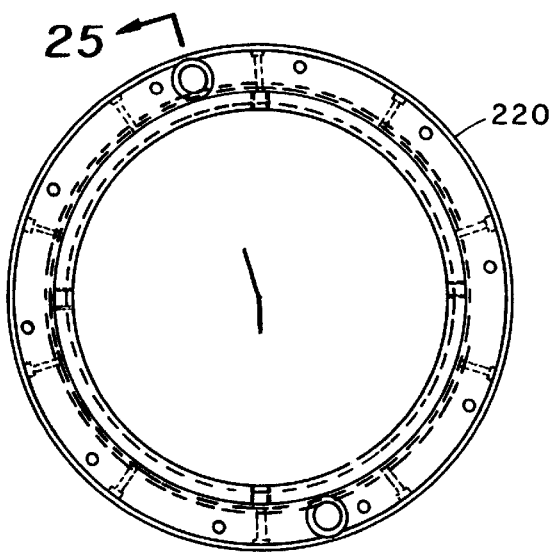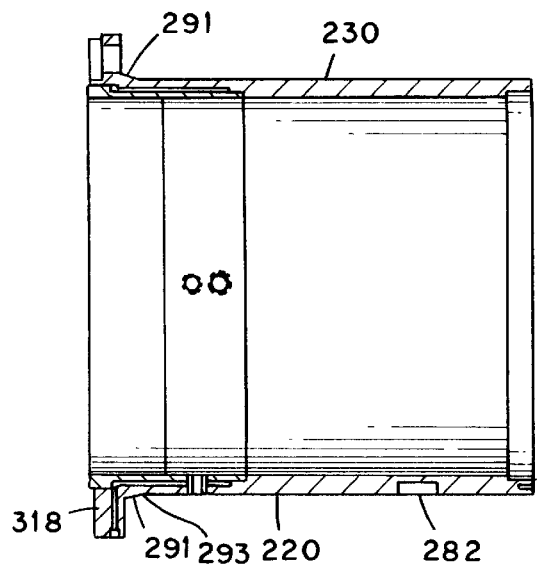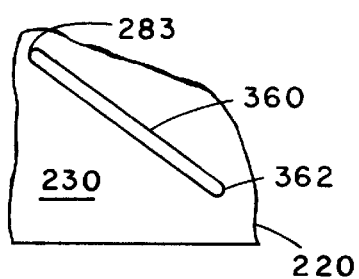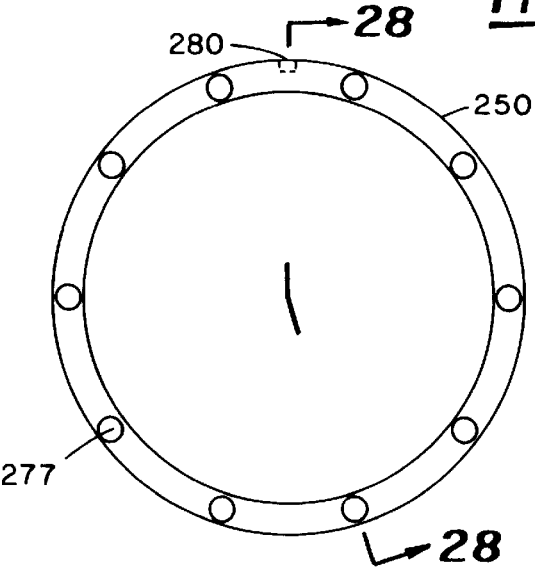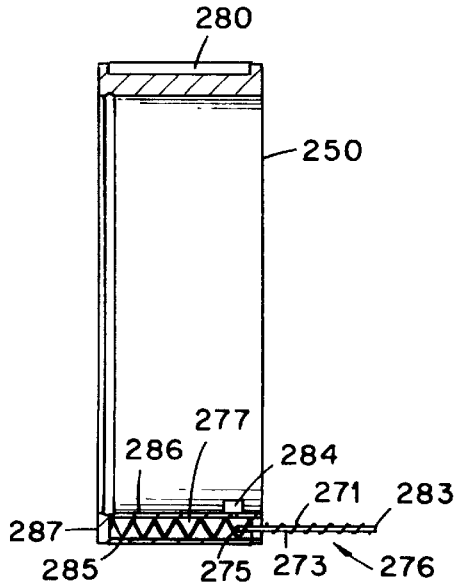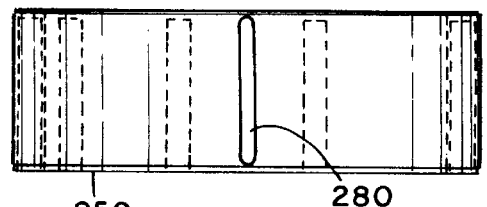

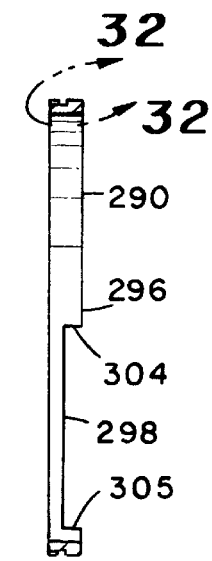
Fig.30
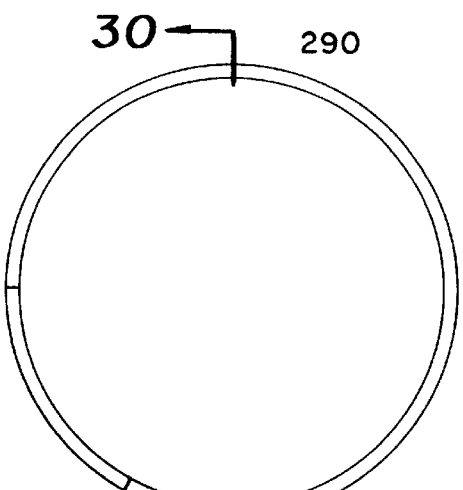
Fig.31
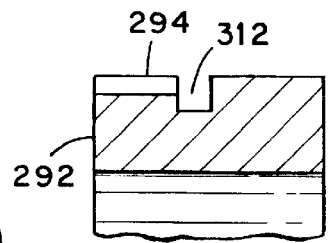
Fig.32
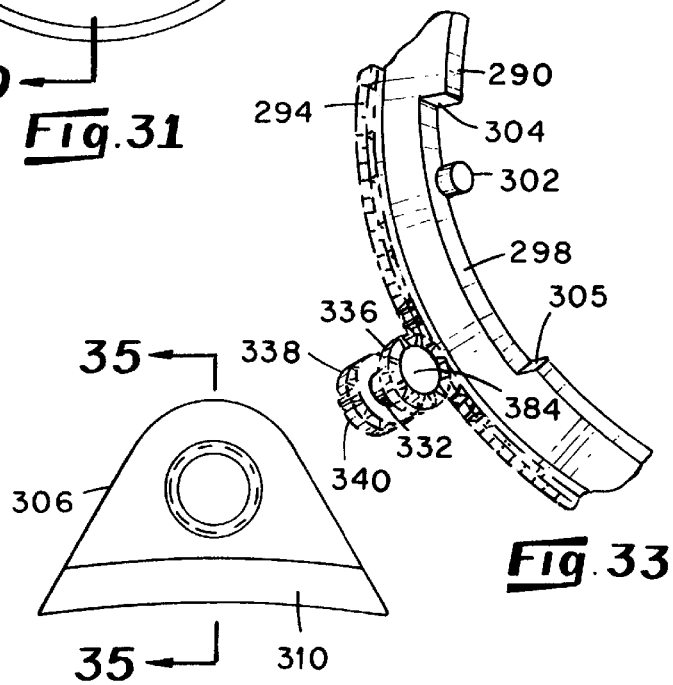
Fig.33
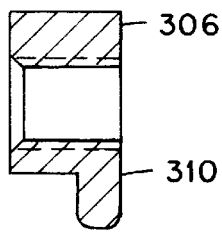
Fig.35
Fig.34
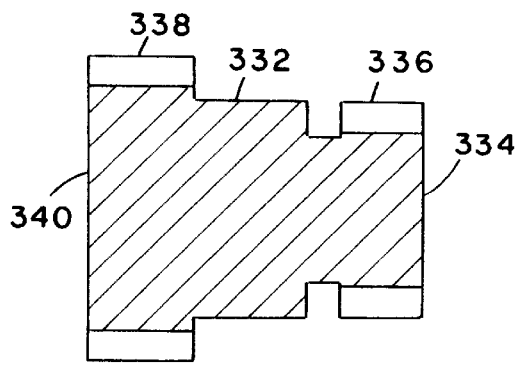
Fig.36
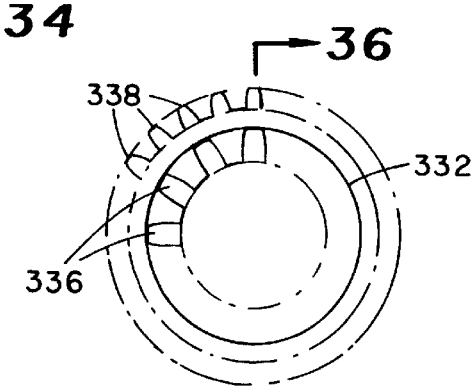
Fig.37

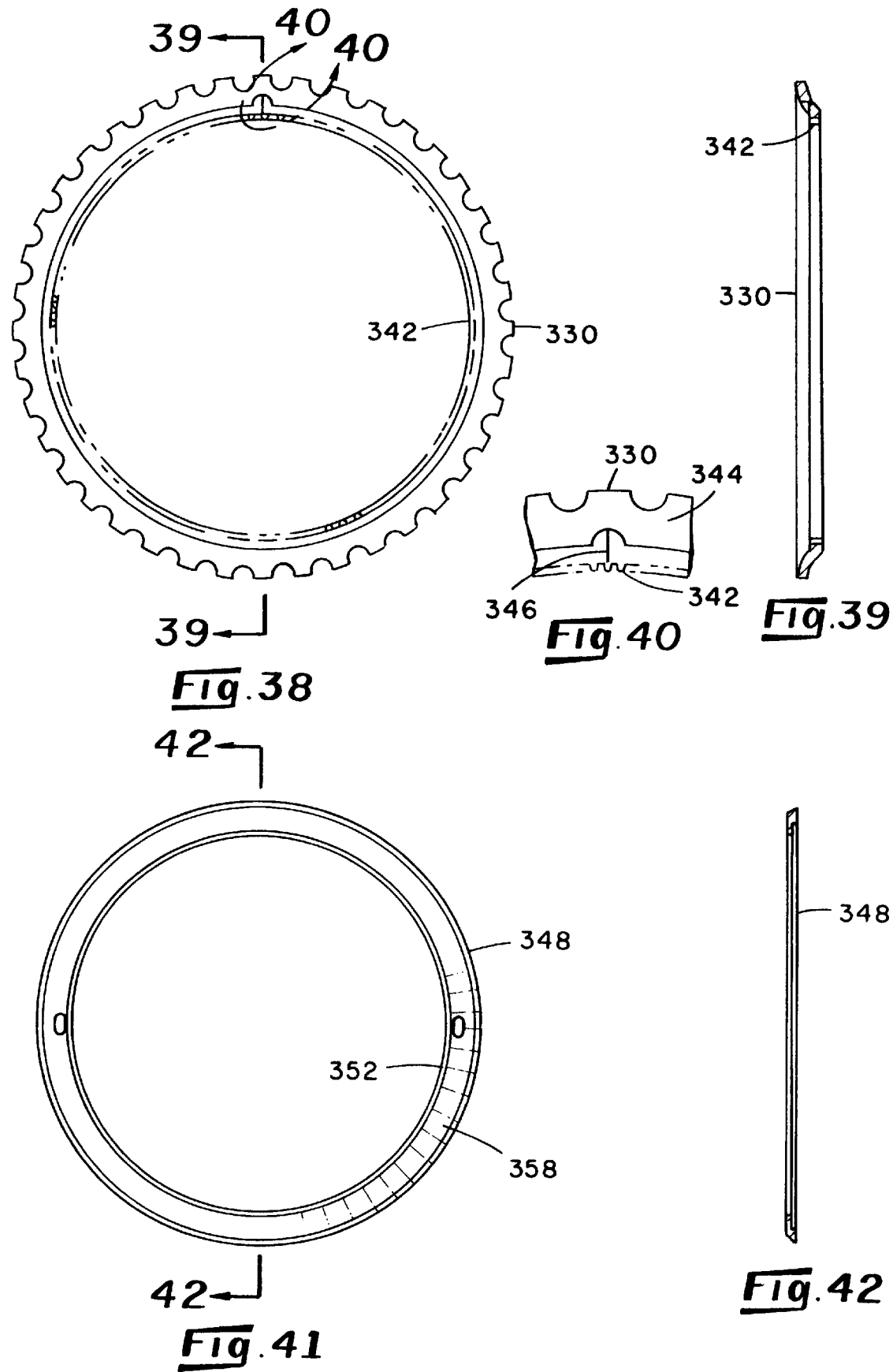

EXPANDABLE BELT AND TREAD DRUM

FIELD OF INVENTION

This invention relates to equipment for use in the manufacture of vehicle tires and particularly to a belt and tread drum having novel diameter expansion/retraction capabilities.

BACKGROUND OF INVENTION

Vehicle tire manufacture most commonly takes place in stages. In an early stage of the manufacturing procedure, there is formed a belt and tread package. This package comprises a plurality of strips (belts) of elastomeric material and/or other similar components that are formed into a toriodal shape by winding the strips about the outer circumference of a rotating belt and tread drum, with bonding of the strips into the belt and tread package. Commonly, the belt and tread package also has included therein metal bead rings that ultimately aid in defining the rim diameter and circumference of the tire. The package thus formed is nonexpandable in diameter. After the package has been formed on the belt and tread drum, the drum most commonly is collapsed in outer circumference to allow removal of the formed package from the drum. Thereafter, the drum is expanded to its desired outer circumference for the forming of a subsequent belt and tread package thereon. The belt and tread package which has been removed from the drum is conveyed to a further stage in the procedure where it is married to a tire carcass and undergoes other stages of manufacture.

In the vehicle tire manufacturing industry, there are many belt and tread machines which have been in use for several years. These machines generally include a core which is cantilevered on a rotatable shaft that is connected at one of its ends to a drive mechanism. The core generally includes some form of outer generally cylindrical shell whose diameter (hence its circumference) is changeable within limits to permit the shell to be collapsed in diameter for removal of a formed belt and tread package therefrom. A substantial number of these shells have no provisions for selecting different overall diameters of the drum and therefore are limited to the manufacture of a belt and tread package for a single size tire. Some of these existing shells have some capacity for changing the overall diameter of the drum, but are most commonly very limited in their range of possible diameter change. It is desired that these existing belt and tread drums be retrofitted with means for enhancing the range of diameters possible to be obtained with the drum, hence make the drum useful in the manufacture of a greater range of tire sizes. It is also desired that the changeover between diameters be made more efficient and friendly to the equipment operator. Attaining these desired results is greatly impeded because of certain of the limitations imposed upon the permissible modifications that can be accepted in designing a retrofit shell for these drums. Specifically, commonly the core of these existing machines is very large in diameter, leaving relatively little annular space in which to make modifications to the shell of the drum. Further, the machines are designed to provide ancillary services, pressurized air for example, to the shell which currently is employed with the machine and any retrofitted shell preferably must be adapted to the location and value of such ancillary services.

It is an object of the present invention to provide a belt and tread drum which includes enhanced expansion/retraction capabilities.

It is another object to provide a retrofit shell for an existing core of a belt and tread drum.

SUMMARY OF INVENTION

In accordance with one aspect of the present invention, there is provided a belt and tread drum which includes an improved annular shell that includes a plurality of circumferentially spaced apart segments, each of which includes an arcuate surface such that the collection of segments defines an outer circumference of the drum. These segments are radially moveable inwardly and outwardly relative to the longitudinal centerline (also the rotational axis) of the drum by means of a plurality of link pairs that connect the segments to a carrier. The several carriers are disposed at spaced apart locations about the circumference of an actuator, which, in turn, is disposed in circumscribing non-fixed relationship to a generally cylindrical hub which, in turn, is disposed in circumscribing fixed relationship to a core of the drum. Radial movement of the several carriers is effected simultaneously by rotation of the actuator about the hub and its supporting core, the rotational movement of the actuator being converted into radial movement of the carriers and their attached segments by the link pairs.

In accordance with one aspect of the present invention, the tubular actuator is rotated about the hub, hence about the core and rotational axis of the drum, by means of a piston member that is pneumatically or hydraulically powered for reciprocating movement within a chamber defined interiorly of and between the actuator and the hub. In one embodiment, that surface of the piston contiguous to the hub is provided with a cam follower that rides in a helical groove provided in the external surface of the hub. The piston is restrained against rotation relative to the actuator during its reciprocatory movement so that its longitudinal movement results in rotational movement of the actuator.

Driving power for extension of the piston from its retracted, at rest, position is provided by pneumatic or hydraulic pressurized fluid. Spring means associated with the distal end of the piston (opposite that end of the piston which is exposed to the pressurized fluid) provide for retraction (return) of the piston from its extended position to its retracted, at rest, position.

In accordance with a further aspect of the present invention, the degree of radial movement of the segments of the drum is selectable between maximum and minimum limits. In the depicted embodiment, this movement selection is by means of a hand wheel mounted exteriorly of the drum at one end thereof. Rotation of this hand wheel, acting through a gear member, that is drivingly connected to the actuator, the degree of rotation of the actuator within the limits set by the selection of the rotational position of the hand wheel. Locking means, including an infinitely adjustable connector ring disposed between the actuator and the gear member, is provided for selectively effecting and releasing interconnection between the gear member and the actuator. To change the limits of rotation of the actuator, the locking means is released. Once the hand wheel has been moved to the desired location, the locking means is moved to a locking position wherein the degree of rotation of the actuator is fixed.

BRIEF DESCRIPTION OF THE FIGURES

FIG. 12 is a side view of a connector plate employed in the interconnection of adjacent segments of the present belt and tread drum;

FIG. 13 is a partial end view of two adjacent connector plates and depicted their relative positions when adjacent segments are expanded and retracted radially to select the outer circumference of the drum;

FIG. 14 is a side plan view of a carrier as employed in the present invention;

FIG. 15 is an end view of the left hand end of the carrier depicted in FIG. 14;

FIG. 16 is a side view of one link as employed in the present invention;

FIG. 17 is a plan view of the link depicted in FIG. 16;

FIG. 18 is a side view of a further link as employed in the present invention;

FIG. 19 is a plan view of the further link depicted in FIG. 18;

FIG. 20 is an end view of an actuator as employed in the present invention;

FIG. 21 is a sectional view of the actuator depicted in FIG. 20 and taken generally along the line 21—21 of FIG. 20;

FIG. 22 is an end view of a rear actuator support ring as employed in the present invention;

FIG. 23 is a sectional view of the actuator support ring depicted in FIG. 22 and taken generally along the line 23—23 of FIG. 22;

FIG. 24 is an end view of a hub as employed in the present invention;

FIG. 25 is a sectional view of the hub depicted in FIG. 24 and taken generally along the line 25—25 of FIG. 24;

FIG. 26 is a side view of a portion of the outer circumference of the hub depicted in FIG. 26 and depicting a helically oriented groove in the outer circumference of the hub;

FIG. 27 is an end view of a piston as employed in the present invention;

FIG. 28 is a sectional view of the piston depicted in FIG. 27 and taken generally along the line 28—28 of FIG. 27;

FIG. 29 is a side view of the piston depicted in FIG. 27 and depicting a groove provided in the outer circumference thereof;

FIG. 30 is an end view of an adjustment stop gear as employed in the present invention;

FIG. 31 is a sectional view of the adjustment stop gear depicted in FIG. 30 and taken generally along the line 31—31 of FIG. 30;

FIG. 32 is a detailed sectional view of a portion of the adjustment stop gear depicted in FIG. 33;

FIG. 33 is a schematic representation of a portion of an adjustment ring gear, a translation gear and a post associated with an actuator as employed in the present invention;

FIG. 34 is a plan view of a adjustment lock block as employed in the present invention;

FIG. 35 is a sectional view of the adjustment lock block depicted in FIG. 34 and taken generally along the line 35—35 of FIG. 34;

FIG. 36 is a sectional view of a translation gear as employed in the present invention and taken generally along the line 36—36 of FIG. 37;

FIG. 37 is a right hand end view of a translation gear as viewed in FIG. 36;

FIG. 38 is a plan view of an adjustment hand wheel as employed in the present invention;

FIG. 39 is a sectional view of the adjustment hand wheel depicted in FIG. 38 and taken generally along the line 39—39 of FIG. 38;

FIG. 40 is an enlarged detail view of a portion of the adjustment stop wheel depicted in FIG. 38;

FIG. 41 is a plan view of a scale ring as employed in the present invention;

FIG. 42 is a sectional view of the scale ring depicted in FIG. 41 and taken generally along the line 42—42 of FIG. 41;

DETAILED DESCRIPTION OF INVENTION

Figure 1:
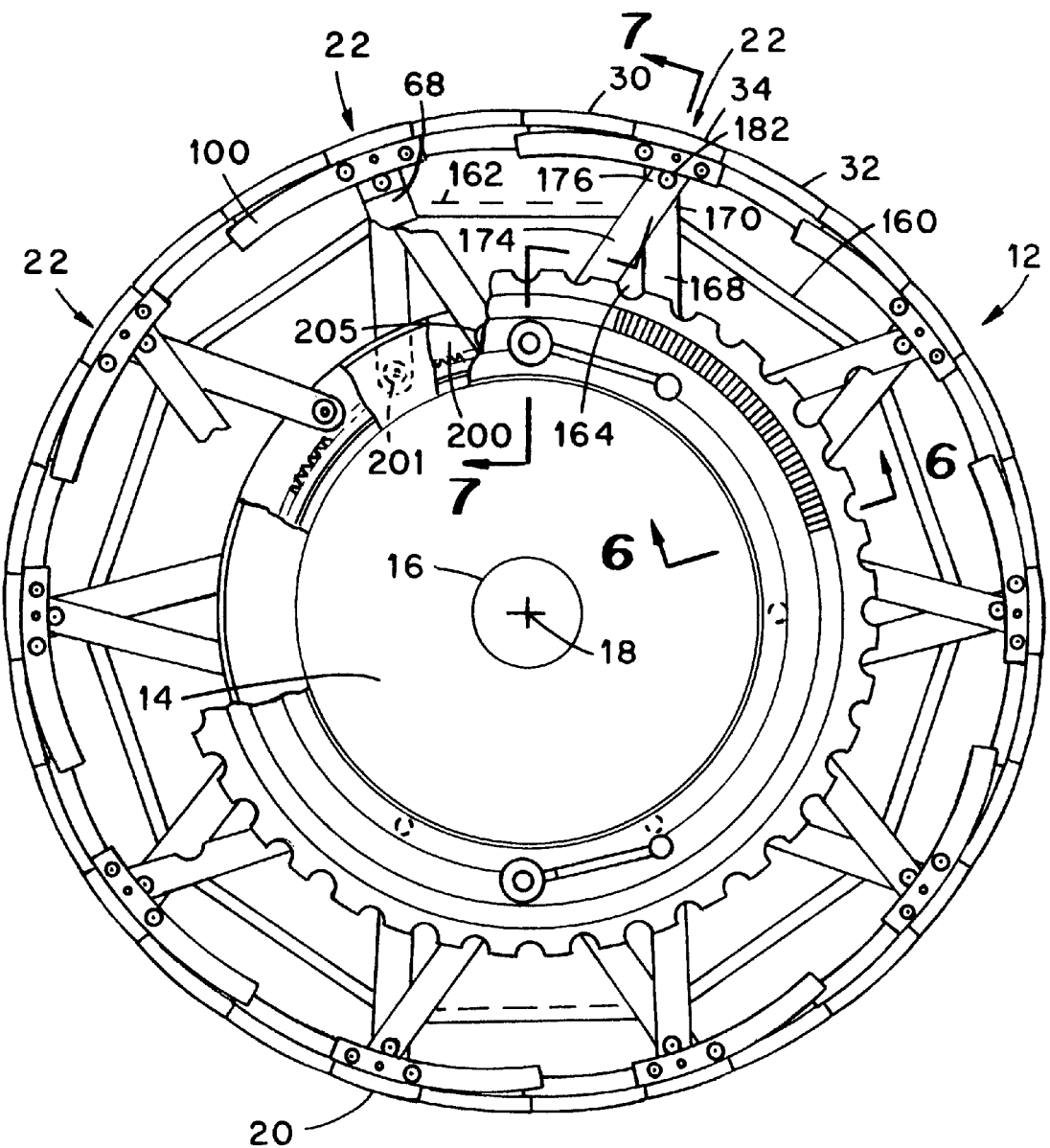
FIG. 1 is an end plan view of one embodiment of a belt and tread drum embodying various of the features of the present invention.
Figure 2:
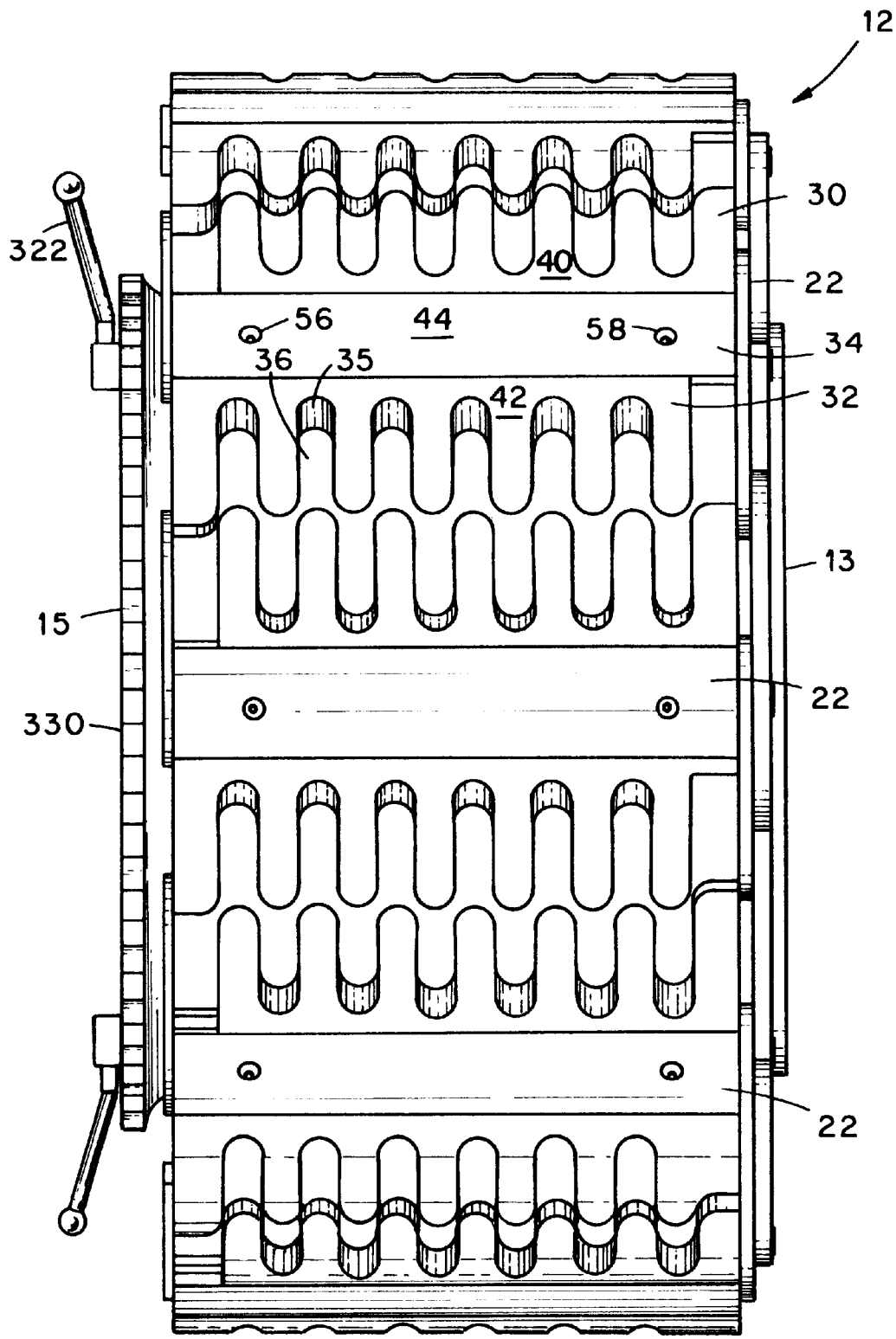
FIG. 2 is a side plan view of the belt and tread drum depicted in FIG. 1.

With reference to FIGS. 1 and 2, in the depicted embodiment of the present invention, there is provided a belt and tread drum indicated generally by the numeral 12 and having opposite ends 13 and 15. The depicted drum includes a cylindrical core indicated generally by the numeral 14 which is adapted to be mounted on a shaft 16 for rotation of the drum about its longitudinal axis 18 (i.e. rotational axis) by a conventional drive means (not shown). In the present invention, a generally cylindrical shell 20 is provided in circumscribing relationship to the core.

The depicted shell 20 includes a plurality of elongated segments 22, each of which is made up of a plurality of sections 30, 32 and 34. Each section includes an arcuate surface 40, 42 and 44, respectively, that is oriented facing radially outwardly of the drum. The plurality of arcuate surfaces of the segments collectively define the outer circumferential surface of the drum.

More specifically, the shell 20 of the depicted belt and tread drum 12 includes a plurality of circumference-defining, multi-sectioned segments 22 whose outer surfaces collectively define an arcuate segment of the outer circumference of the drum 12. Each segment 22 is mounted to a carrier 68 for radial movement with respect to the longitudinal centerline 18 of the drum 12.

Figure 3:
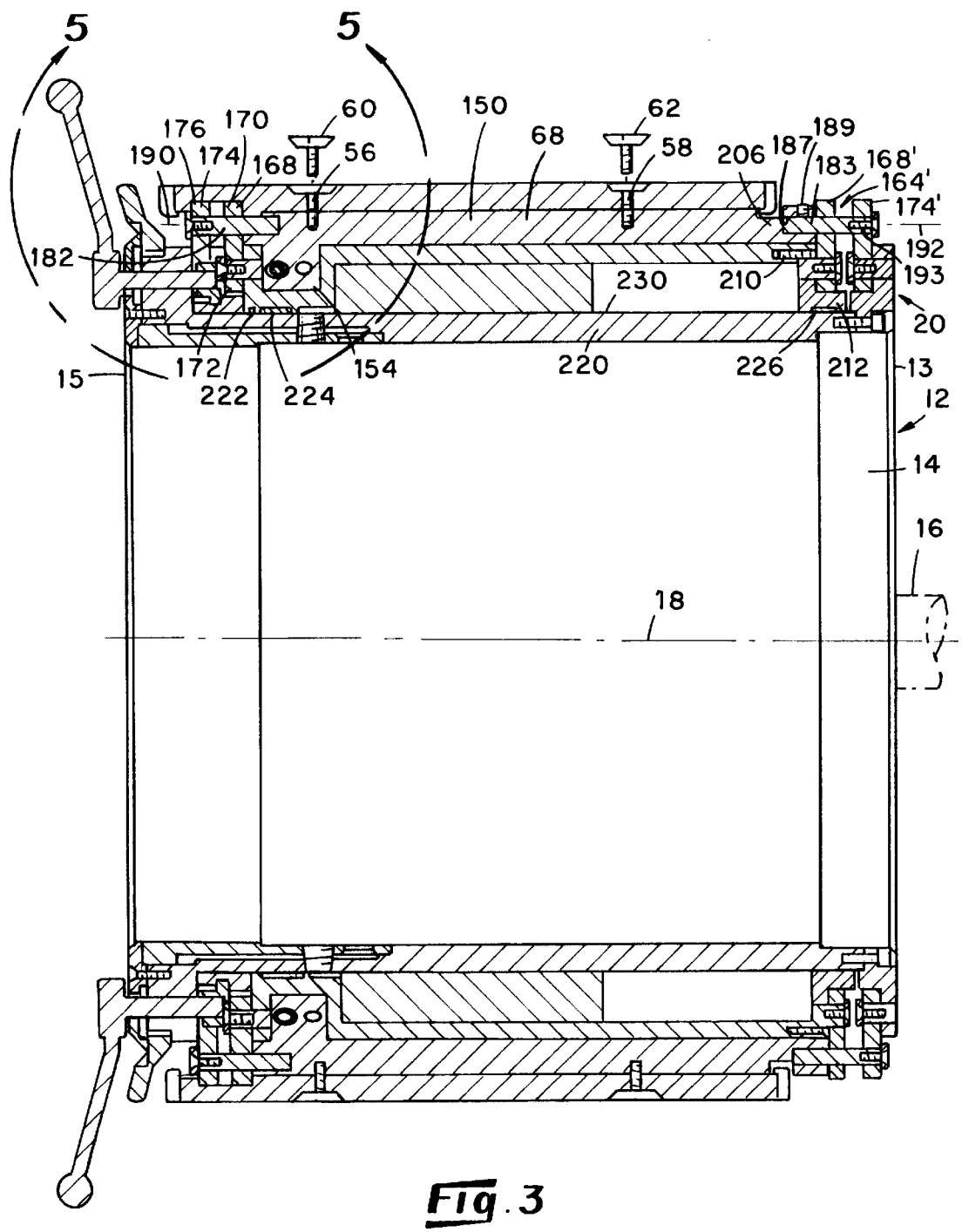
FIG. 3 is a sectional view of the belt and tread drum of FIG. 1 taken generally along a diameter of the drum, but modified with respect to the relational position of various components of the drum in order to depict certain of these components in a single Figure.
Figure 4:
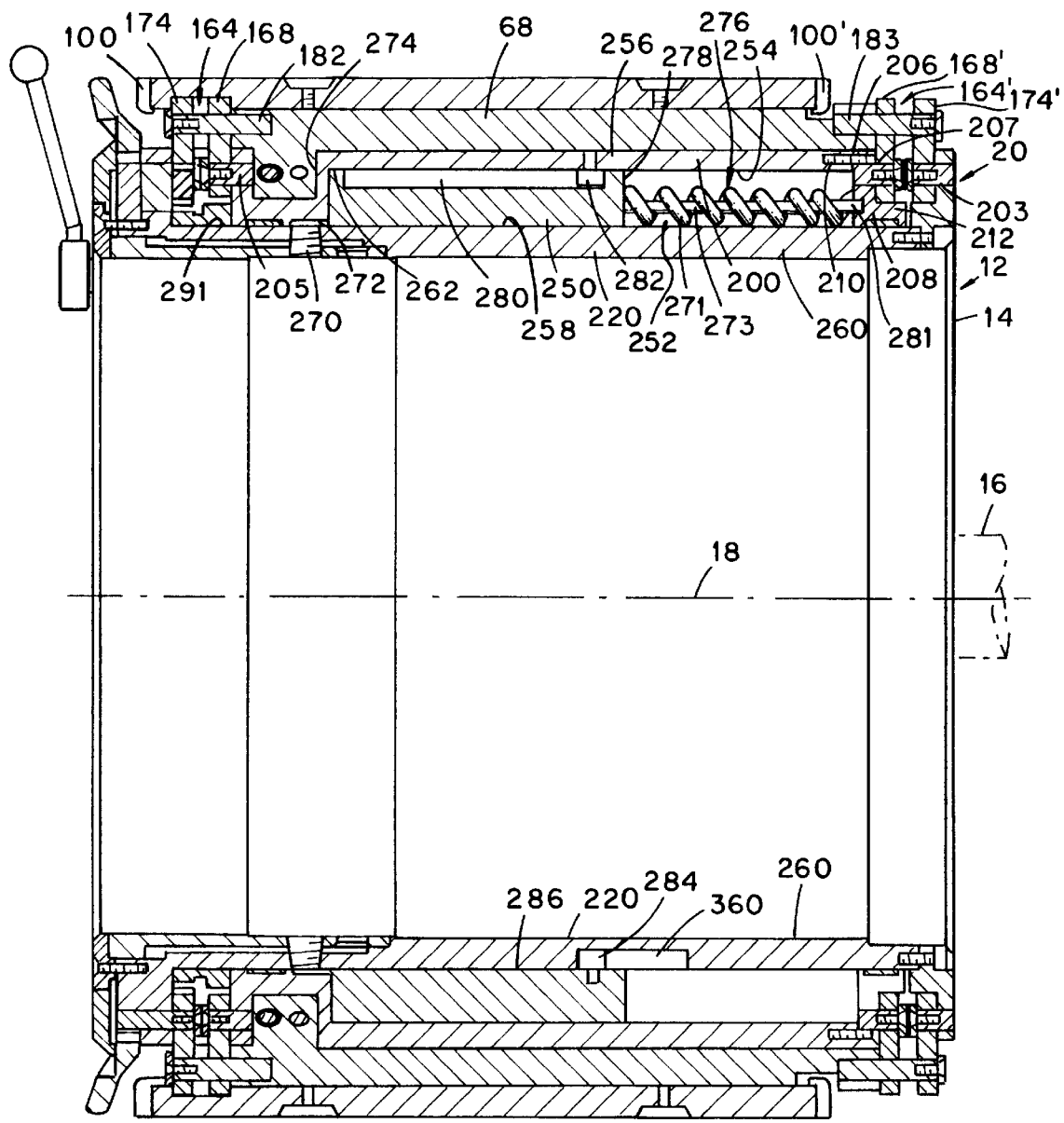
FIG. 4 is a further sectional view of the belt and tread drum of FIG. 1 taken generally along a diameter of the drum, but further modified with respect to the relational position of various components of the drum in order to depict certain of these components in a single Figure.
Figure 5:
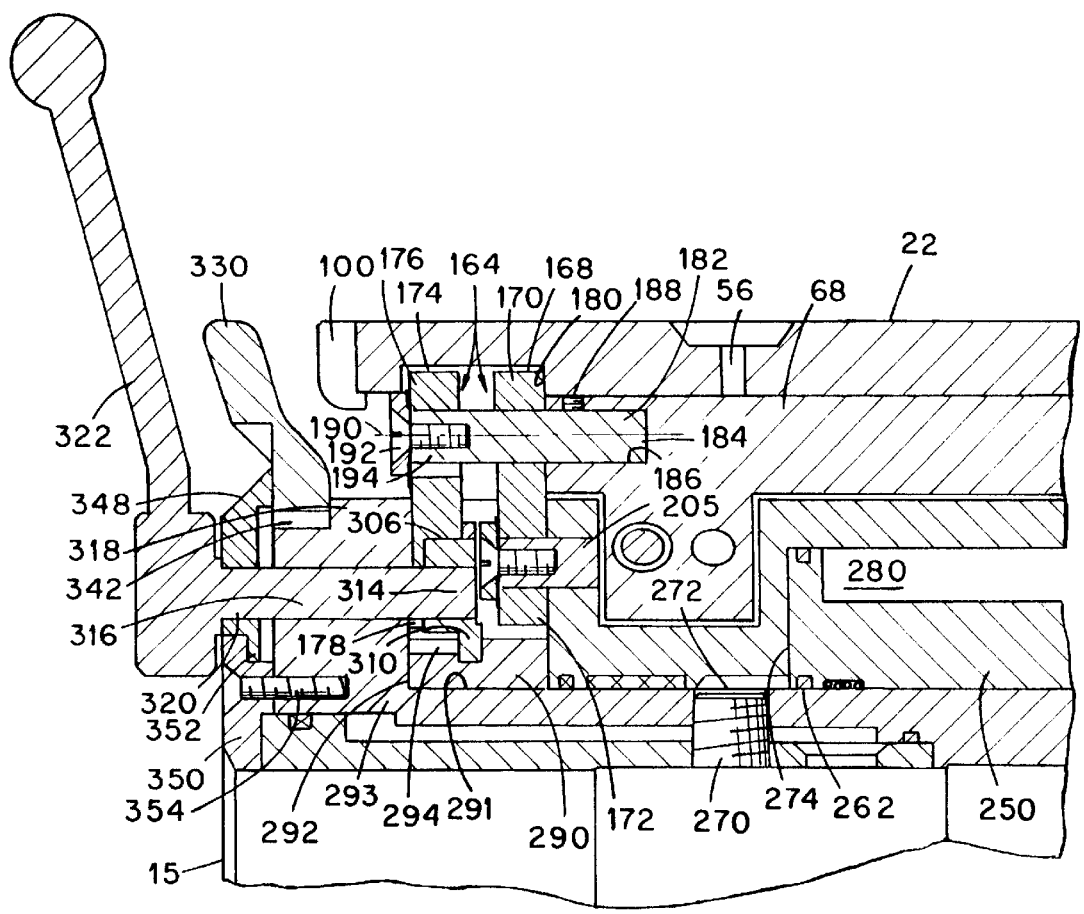
FIG. 5 is an enlarged view of that portion of FIG. 3 taken generally along the line 5—5 of FIG. 3.
Figure 8:
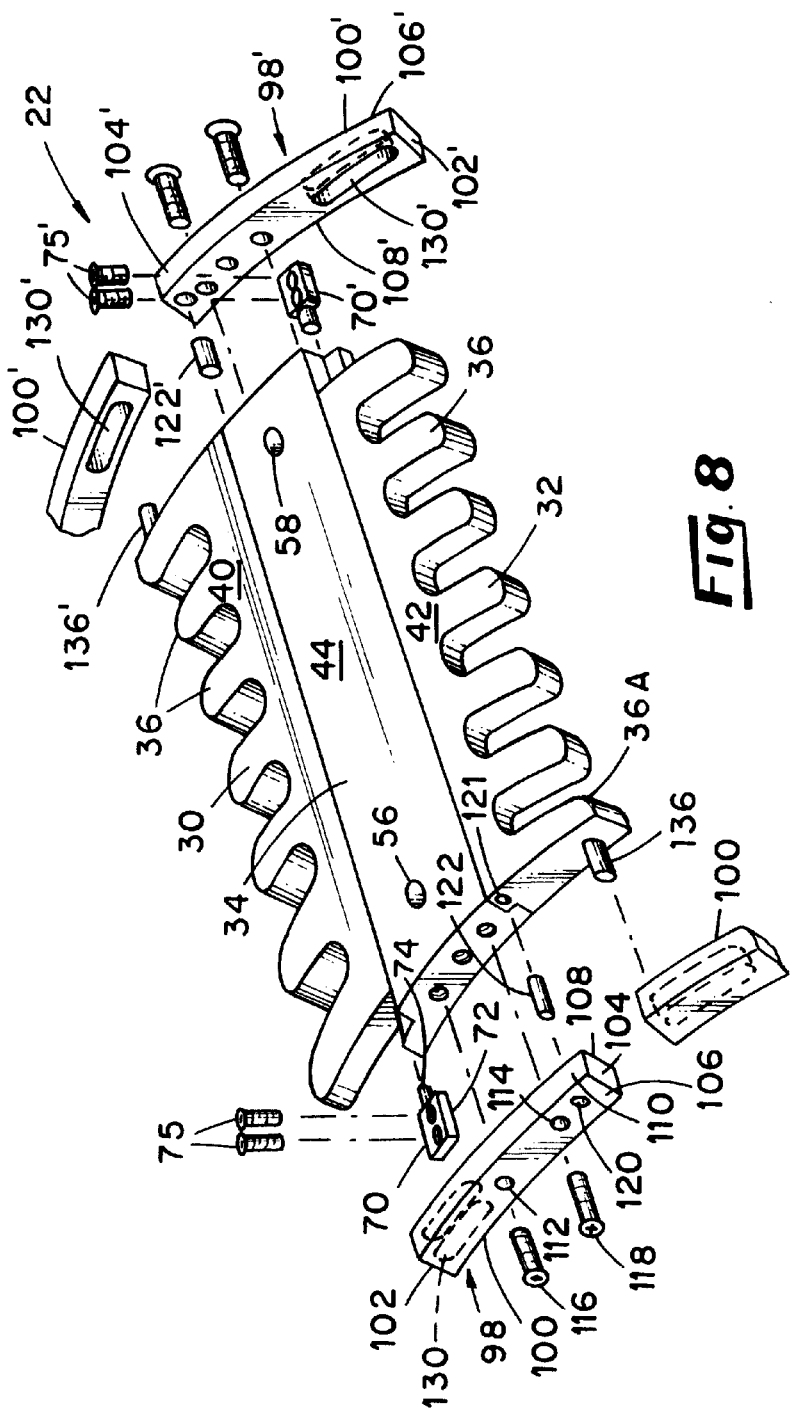
FIG. 8 is an exploded representation of one embodiment of a segment useful in the belt and tread drum of the present invention.

As best shown in FIGS. 2 and 8, each segment 22 of the depicted drum 12 includes a first side section 30, a second side section 32 and an intermediate section 34 disposed between the side sections 30 and 32. Each side section 30 or 32 of each segment 22 is provided with a plurality of slots 35 along one of its longitudinal side margins. Defined between these slots 35 are alternating fingers 36 that are designed to be received within the slots 35 of the side section 30 or 32 of an adjacent segment 22. In FIG. 3, the several segments 22 are depicted with the fingers 36 of the side sections thereof being substantially received within respective mating slots 35 of adjacent segments 22. In this position of the segments 22, the circumference of the drum 12 is at its minimum value. In the maximum expanded circumference of the drum, the fingers 36 of the several segments 22 being withdrawn (partially) from the slots 35 of respective adjacent segments 22.

With reference to FIGS. 2, 8–13, each of the side sections 30 and 32, and the intermediate section 34 extends along almost the entire length of the drum 12 and defines an outer arcuate surface 40, 42 and 44, respectively. In addition, each side section 30 and 32 includes a stepped marginal edge opposite the fingers 36 having a lip 46. Along the end surface of the outermost finger, indicated 36A, of each side section 30 or 32, there is provided a bore 48 whose purpose will become apparent herein, and there is provided in opposite ends of the lip 46 bores 50 and 50' which are used to hingedly attach the side section 30 and 32 to the intermediate section 34 in a manner described herein.

Figure 9:
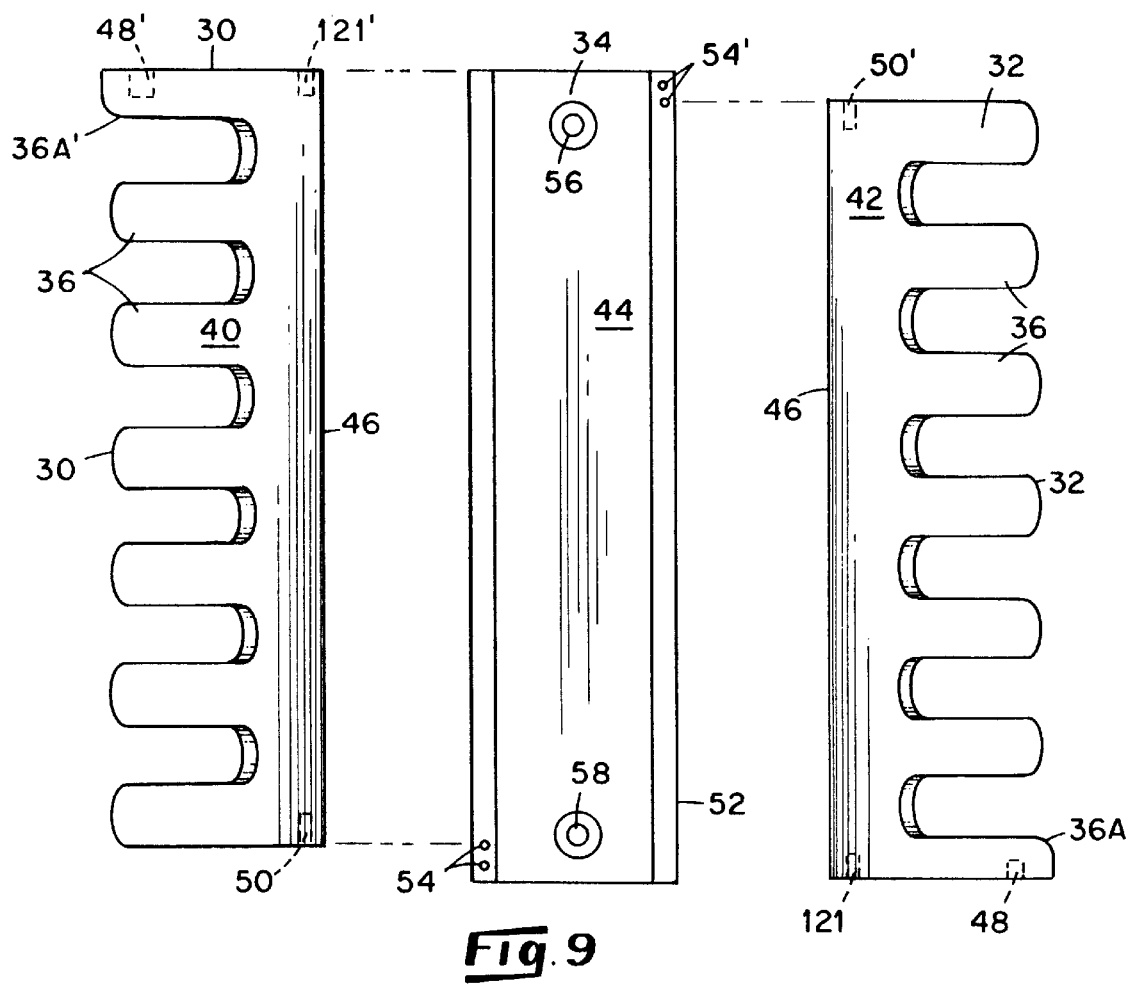
FIG. 9 is an exploded top plan view of the sections of the segment of FIG. 8.
Figure 10:
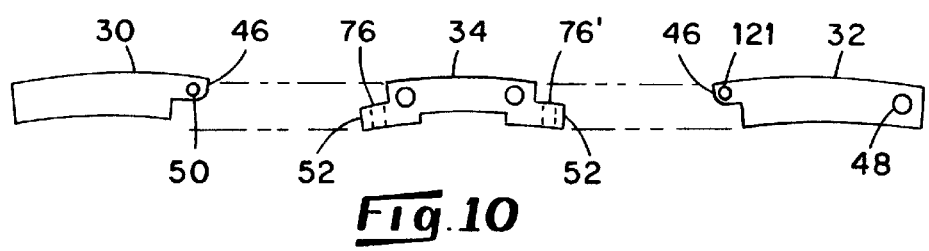
FIG. 10 is an end view of the sections depicted in FIG. 9.
Figure 11:
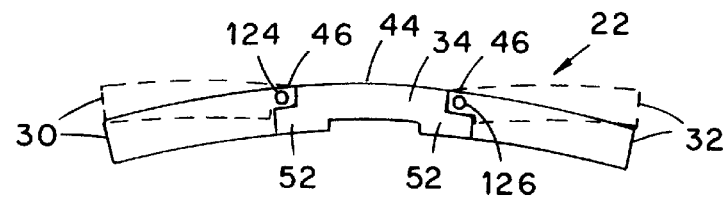
FIG. 11 is an end view of the sections depicted in FIG. 9 and with the sections pivotally joined and further depicting the pivotal movement of the side sections with respect to the central section of the segment.

With reference still to FIGS. 2, 8–13, each intermediate section 34 includes a stepped marginal surface extending along the sides thereof and which includes a lip 52. As depicted, there is provided along one side of the lip 52 (i.e. the upper surface as shown in FIG. 9) are pairs of internally-threaded openings 54 and 54' used in the hinged attachment of the intermediate section 34 to a corresponding one of the side sections 30 and 32 in a manner described hereinafter. Defined in the outer surface 44 of the intermediate section 34 and adjacent the ends thereof are through-bores 56, 58 for accepting bolts 60 and 62 (FIG. 3) with which the segment 22 is attached to a corresponding carrier 68, (see also FIGS. 2 and 9).

For hingedly securing one end of each side section 30 or 32 to their respective intermediate section 34 and with reference again to FIG. 8, there are provided stud members 70 and 70', each having a body 72 and a pin portion 74 projecting from the body 72. Each stud member, 70 for example, is secured to the intermediate section 34 with screws 75 which extend through the body 72 of the member 70 and are threadably received by the internally-threaded openings 54 and 54' (FIG. 9) of the intermediate member 34. Once the stud members 70 and 70' are secured to the intermediate section 34 with the screws 75, each side section 30 or 32 is arranged adjacent a corresponding marginal side edge of the intermediate section 34 so that the lip 46 of the side section 30 or 32 overlies the lip 52 of the corresponding marginal edge of the intermediate section 34 and so that the bores 50 and 50' provided in an end of each of side sections 30 or 32 pivotally accepts the pin portion 74 of a corresponding stud member 70 and 70'.

With reference to FIGS. 1, 2, 8, 12 and 13, each segment 22 also includes guide means 98 and 98' mounted on the opposite ends of a segment 22 for coordinating the movement of the side sections 30 and 32 with those side sections of an adjacent segment 22 as the segments 22 are moved radially of the drum axis 18. The guide means 98 and 98' of the depicted embodiment includes a pair of elongated plates 100 and 100' each having two opposite ends 102, 102' and 104, 104' and two opposite side faces 106, 106' and 108, 108' extending between the ends 102, 102' and 104, 104' respectively. As best shown in FIGS. 8 and 12, each guide plate 100, for example, is arcuate in shape so that the curvature of its outer surface, indicated 110, corresponds with that of the outer surfaces 40, 42 and 44 of the segment sections 30, 32 and 34. Two through-openings 112 and 114 extend between the faces 106 and 108 for receiving the shanks of bolts 116, 118 (FIG. 8) used to attach the plate 100 to a corresponding end of the intermediate section 34. As depicted the end 102 of the guide plate 100 projects laterally (to the left as viewed in FIG. 8) from the section 34. The guide plate 100' is mounted to the opposite end of the section 34 in like manner but with the end 102' thereof projecting from the section 34 to the right as viewed in FIG. 8.

Furthermore, a through-bore 120 extends between the faces 106, 108 at a location adjacent the plate end 104. One end of a pin 122 (FIGS. 8, 12) is fixed within the through-bore 120, and the other end of the pin 122 is loosely received in a bore 121 provided in the side face of the outermost finger 36A of the side section 32. It follows that with one end of each side section 30 or 32 being secured to the intermediate section 34 by way of a stud member 70, 70' and the other end of each side section 30 or 32 being secured to the intermediate section 34 by way of the guide plates 100, 10' and pin 122, 122' each side section 30 or 32 is pivotally attached to the intermediate section 34 for hinged movement relative thereto about a pivot axis 124 or 126 between its position shown in solid lines in FIG. 11 and its position shown in phantom in FIG. 11. Accordingly, the diameter of each bore 121 is slightly larger than the diameter of the corresponding pin portion 74 or pin 122 accepted thereby. When each segment 22 is secured to its carrier (FIG. 1) in its operative position about the drum 12, each axis 124 or 126 about which the side section 30 or 32 is permitted to pivot is substantially parallel to the drum axis 18.

With reference again to FIGS. 8, 12 and 13, each guide plate 100, 100' is also provided with an elongated slot 130, 130' which is defined within each guide plate so as to extend substantially linearly along its side face 108. As best shown in FIG. 12, the end 132 of the slot 130 situated adjacent the plate end 102 is closer to the outer surface 110 of the plate 100 than is the opposite end 134 of the slot 130 thereby orienting the slot at an angle with respect to a radius of the apparatus. It is a feature of the guide plate 100 that as each segment 22 is moved radially toward or away from the drum axis 18, the side sections 30 and 32 of an adjacent segment 22 are pivotally moved relative to its corresponding intermediate section 34 by a corresponding amount. To this end and with reference again to FIG. 8, one end of a pin 136, 136' is fixedly received in the outermost finger 36A, 36A' of each side section 30 and 32 adjacent the tip thereof, and the other end of the pin 136, 136' is loosely received in the slot 130, 130' of a respective guide plate 100 of an adjacent segment 22. Thus, as the intermediate section 34 of each segment 22 is moved radially toward or away from the drum axis 18, the pin 136 is guided along the slot 130. Alternately, the guide plate may be provided with a curved outer surface which is engaged by the pin of an adjacent side section in the nature of a cam and cam follower.

It follows from the foregoing that as the segments 22 are moved radially toward and away from the drum axis 18 between, for example, the position illustrated in solid lines in FIG. 13 and the position illustrated in phantom in FIG. 13, the guide plates 100 of adjacent segments 22 move closer together or further apart. As the plates 100 are moved relative to one another in this manner, each pin 136 (to which a side section 30 or 32 is secured) slidably moves along its corresponding slot 130 from one end 132 of the slot 130 to the opposite end 134 of the slot 130. Furthermore, since the slot 130 is oriented as aforedescribed (so that one of its ends is situated closer to the outer surface 110 than is the other end), the side sections 30 and 32 of the adjacent segment 22 are hingedly moved relative to its intermediate section 34 about the pivot axes 124 or 126 as the intermediate section 34 is moved toward and away from the drum axis 18. In other words, as the intermediate section 34 of one segment 22 is moved radially outwardly of the drum axis 18, the side sections 30 and 32 of the one segment 22 are hingedly moved by the guide plates 100 of an adjacent segment 22 relative to the intermediate section 34 from, for example, the solid line position shown in FIG. 11 toward the position shown in phantom in FIG. 11. Conversely, as the intermediate section 34 of one segment 22 is moved radially toward the drum axis 18, the side sections 30 and 32 of the one segment 22 are hingedly moved by the guide plates 100 of an adjacent segment 22 relative to the intermediate section 34 from, for example, the FIG. 11 phantom-line position toward the FIG. 11 solid-line position.

Further description of the segments 22 is given in copending application Ser. No. 08/547,381, filed Oct. 24, 1995, now Pat. No. 5,635,016, entitled: APPARATUS WITH ADJUSTABLE CIRCUMFERENCE, which copending application is, by reference, incorporated herein in its entirety.

Whereas there is described herein a "three-sectioned" segment, it is to be recognized that in accordance with one aspect of the present invention, each segment may comprise only two sections which are hingedly connected as by a hinge rod about a common hinge line.

As noted, each of the shell segments 22 is mounted to a respective one of plurality of carrier members 68. With reference to FIGS. 1–6, 14 and 15, each carrier member 68, in the depicted embodiment, comprises an elongated body portion 150 that extends substantially between the opposite ends 13 and 15 of the drum. Each carrier member further includes, adjacent one of its ends, end 152, for example, a radially inwardly projecting lug 154. Each lug 154 is provided with first and second through passageways 156 and 158 for receiving therein stabilizing rods 160 and 162 (see FIG. 1) as will be further described hereinafter.

Each carrier member 68 serves also as the mounting for first and second pairs of links, indicated generally by the numerals 164 and 164' respectively. As depicted in FIGS. 1, 3–6, 16–19, the first pair of links 164 includes a first elongated link 168 having opposite ends 170 and 172, and a second elongated link 174 having opposite ends 176 and 178. The end 170 of the first link 168 and the end 176 of the second link 174 is pivotally pinned to the end 180 of the carrier member 68, for example, by a common pin 182 having one end 184 thereof anchored in a bore 186 in the end 180 of the carrier 150 as by a set screw 188. From the common pin 182, the links 168 and 174 extend generally radially inwardly of the drum. These links 168 and 174 are individually pivotable about their common pinning axis 190. Screw means 192 is provided in the outboard end of the pin 182 to retain the link 174 on the pin.

The second set of links 166 includes a first elongated link 168' having opposite ends 170' and 172', and a second elongated link 174' having opposite ends 176' and 178'. The end 170' of the first link 168' and the end 176' of the second link 174' are pivotally pinned to the end 181 of the carrier member 68 by a common pin 183 having one end 185 thereof anchored in a bore 187 in the end 181 of the carrier 68 as by a set screw 189. From the common pin 183, the links 168' and 174' extend generally radially inwardly of the drum. These links 168' and 174' are individually pivotable about their common pinning axis 192. Screw means 193 is provided in the outboard end of the pin 183 to retain the link 174' on the pin. As depicted, the pinning axes of the pins 182, 183, 201, 203, 205, 207 are parallel with one another and with the rotational axis 18 of the drum. By this means, rotation of the actuator 200 about the longitudinal centerline 18 of the drum results in only arcuate displacement of the pins 205, 207, hence arcuate displacement of the ends 172, 172' of the links 174, 174'. Notably, this arcuate displacement of the pins, hence the ends of the links, does not alter their radial distance from the longitudinal centerline of the drum.

The radially inward ends of the several links 168, 168', 174 and 174' are pivotally mounted to the hub 220 or to the actuator 200. Specifically, the radially inward ends 178, 178' of the links 174, 174' are pivotally mounted on the hub as by pins 201, 203, hence their respective pivot axes are fixed. The radially inward ends 172, 172' of the other links 168, 168' of the sets of links are pivotally mounted on the actuator 200 as by pins 205, 207. The actuator is rotatable relative to the hub so that the pivotal axes of the ends 172, 172' of the links 168, 168' are displaceable along a circular path that is concentric with the rotational axis 18 of the drum and with the hub. Thus, it will be recognized that circumferential displacement of the pivotal axes of the radially inward ends of the first links, 168, 168' relative to the pivotal axes of the radially inward ends 178, 178' of the second links 174, 174' serves to move these pivotal axes together or apart, depending upon the direction of rotation of the actuator relative to the hub.

The several carrier members 68 and their associated segments 22 are disposed at spaced apart locations about the circumference of the generally tubular actuator 200. As best seen in FIGS. 3–7, 21 and 22, the actuator 200 includes a "U" shaped circumferential groove 202 adjacent one end 204 of the actuator and which opens radially outwardly. This groove 202 is of a geometry and size suitable for the slidable receipt therein of the lugs 154 of the several carrier members 68. Thus, the actuator is free to rotate relative to the fixed-position carrier members and about the longitudinal axis 18 of the drum.

Adjacent the opposite end 206 of the actuator 200 there is provided a support ring 208 adapted to be removable secured to the end 206 of the actuator as by screws 210 (FIG. 3). When in place on the actuator, the ring 208 projects radially inwardly of the actuator and defines a circumferential shoulder 212 that is adapted to slidably engage the outer surface 230 of the hub.

The actuator 200 is mounted in encircling relationship with the generally tubular hub 220. The hub 220 is fixedly secured in encircling relationship with the cylindrical core 14. The actuator is rotatable about the fixed hub. Circular seals 222, 224 and 226 disposed between the inner circumferential surfaces 228 and 212 of the actuator and the outer circumference 230 of the hub are provided to preclude to flow of gas or liquid past the location of the seals for purposes which will appear herein.

Since the hub 220 is fixed against rotation with respect to the core 14, and the ends of the links 174, 174' of the pairs of links remain stationary and do not move when there is arcuate displacement of the pinning axes of these ends, any arcuate movement of these pinning axes which is the result of rotation of the actuator relative to the hub causes the pinning axes of these pins to move arcuately apart or toward their common longitudinal alignment. It will be recognized that this arcuate displacement of these pinning axes associated with the ends 172, 172' of the links 168, 168' has the effect of radially displacing the common pinning axis of the commonly pinned ends 170, 170' and 176, 176' of the pairs of links 164 and 166, hence concomitant radial displacement of the carrier 68 and increase or decrease in the outer diameter (circumference) of the drum.

In the present invention, the circumference of the drum is effected at the commencement of a process for making a belt and tread package of a desired size (for a given size tire). This requires that the segments of the drum be moved radially outwardly of the drum to expand the circumference of the drum to the desired value. After the belt and tread package has been formed on the expanded drum, the circumference of the drum is reduced by retracting the segments radially inwardly of the drum. This cycle of expansion/retraction commonly must take place within about a 45 second time period. During a given manufacturing time period, such as a work shift, it is at times desired to change the size (diameter) of the belt and tread package being produced so as to provide a belt and tread package that is suitable for the manufacture of a different size tire. To effect this cycle of expansion/retraction of the segments of the drum, the present inventor provides for radial expansion/retraction of the segments through the rotational movement of the actuator between maximum and minimum limits. With particular reference to FIGS. 4 and 27–29, there is depicted means for effecting rotational movement of the actuator relative to the hub. In the depicted embodiment, this means is in the form of a cylindrical piston member 250 which is reciprocatably disposed within a cylindrical cavity 252 defined between a portion of the radially inward surface 254 of a wall 256 of the actuator and a portion of the radially outward surface 258 of wall 260 of the hub. Within the cavity, the piston is slidable between a retracted position (to the left as viewed in FIG. 4 and an extended position (to the right as viewed in FIG. 4). A circumferential seal 262 is provided adjacent one end of the piston to seal against the flow of pneumatic or hydraulic fluid between the outer circumference of the piston and the inner circumference of the cavity.

Power for propulsion of the piston from its retracted position toward its extended position is provided from an external source (not shown) of pressurized fluid which is connected in fluid flow communication with a port 270 provided through the wall 260 of the hub and into an internal passageway 272 that leads from the port to the cavity at a location adjacent the rear end 274 of the piston 250. Pressurized fluid admitted to the cavity 252 through the port 270 and passageway 272 moves the piston from the left to the right of the cavity as viewed in FIG. 4. Return of the piston to its retracted position is effected in the depicted embodiment by one or more spring means 276 that is disposed within the cavity 254 and between the piston and the rear support ring 208 for the actuator. As seen in FIGS. 4, 27–29, the spring means 276 may take the form of a plurality of helically coiled springs 271 that encircle respective rigid rods 273. One end 281 of each rod is anchored in the rear support ring 208 and projects therefrom to provide support for its encircling spring. The opposite end 275 of each rod is slidably received in a respective bore 277 in the piston.

Further, one end 283 of the spring 271 abuts the rear support ring and the opposite end 285 of the spring is received within a respective bore 277 in the piston, along with its respective rod, and abuts the rear end 287 of the bore 277. When the piston in is its retracted position (to the left as viewed in FIG. 4), only a small portion of the length of the rod is disposed within its respective bore and the spring is relatively relaxed. As the piston is moved toward its extended position, more of the rod enters its bore and the spring becomes compressed. The depth of the bore 277 is chosen to provide for sufficient left-hand movement of the end 275 of the rod further into the bore by a distance which permits the piston to move to the right, as viewed in FIG. 4, by its selected maximum travel limit. It will be recognized that this travel limit permits that amount of piston movement which effects the desired degree of rotation of the actuator.

As depicted in FIGS. 4, 26–28 and 29, there is provided an radially outwardly opening elongated groove 280 in the outer circumference of the piston. This depicted groove is aligned with its longitudinal axis parallel to the longitudinal axis 18 of the drum. A follower roller pin 282 is provided in the wall 256 of the actuator and projects therefrom to be received within the groove 280. Thus, the circular piston is precluded from rotating relative to the actuator as the piston is moved between its retracted and extended positions. The piston, however, remains free to rotate with the actuator. Further, there is provided a radially outwardly opening helically oriented elongated groove 360 within the wall 260 of the hub, this groove having opposite ends 283 and 362. A follower roller pin 284 is provided in the wall 286 of the piston and projects therefrom to be received within the helically oriented groove 360. As the piston is moved between its retracted and extended positions, the net effect is that the piston and the actuator are rotated about the longitudinal axis of the drum by an amount which is determined by the pitch of the helical groove 360 and the distance of travel of the piston. It will be recognized that the direction of the rotation of the piston and actuator combination is reversed, depending upon the direction of movement of the piston. Thus, rotation of the actuator in a first direction functions to expand the segments radially outwardly, and rotation of the actuator in a second and opposite direction functions to retract the segments radially inwardly of the drum. The maximum and minimum limits of expansion and retraction of the segments, under these conditions, is a function of the distance of travel of the piston, hence the distance of travel of the follower roller pin 284 along the length of the helical groove 360. Since it is desired that the drum be capable of producing several different size belt and tread packages for different size tires, it is necessary that the length of the helical groove, hence the permissible limits of travel of the piston, be sufficient to permit piston movement (and concomitant rotation of the actuator) over a distance which encompasses all desired sizes of belt and tread packages. Control over the distance which the pressurized fluid-powered piston travels during a cycle is very difficult and imprecise. Further, it is practically impossible to adjust the limits of piston travel when it is desired that the maximum and minimum limits of its travel be changed. In the present invention, these problems are overcome by means of apparatus designed to physically establish maximum and minimum limits of rotation of the actuator about the hub, all within the greater maximum and minimum limits of piston travel.

Figure 6:
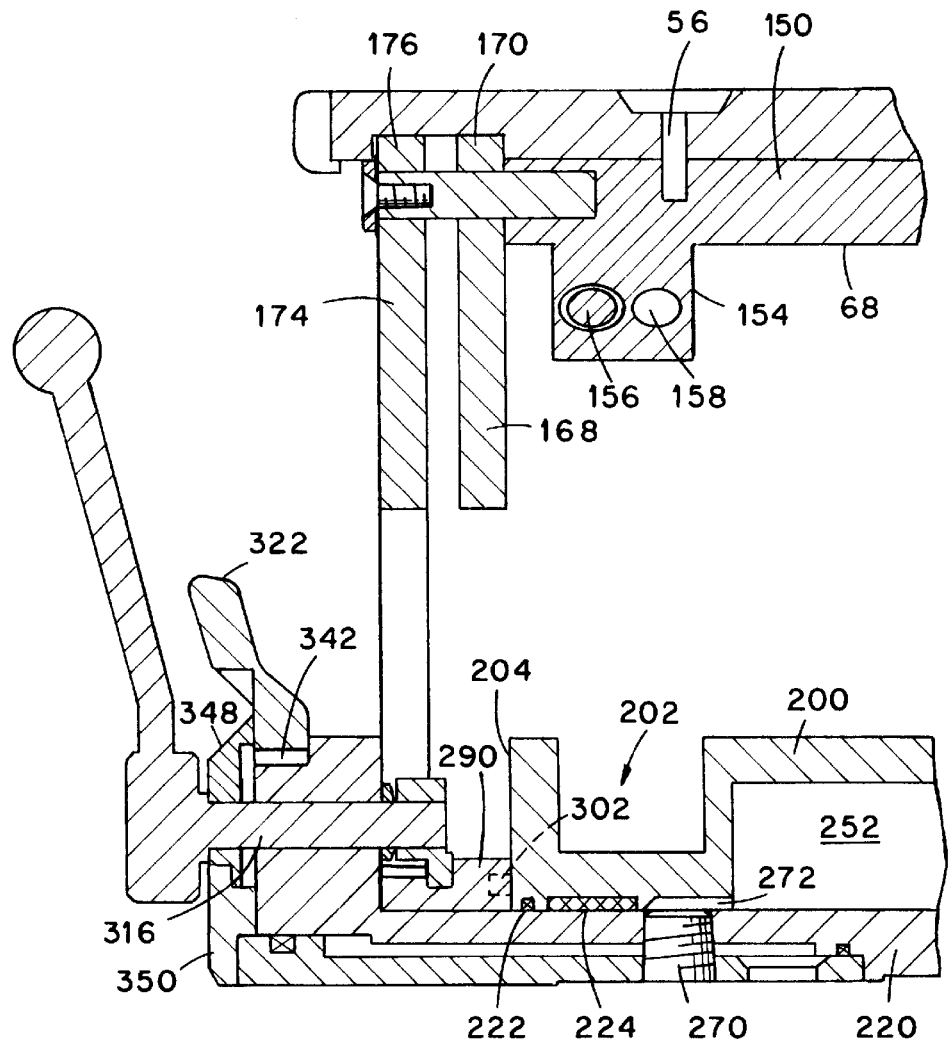
FIG. 6 is a partial sectional view of the belt and tread drum of FIG. 1 and taken generally along the line 7—7 of FIG. 1.
Figure 7:
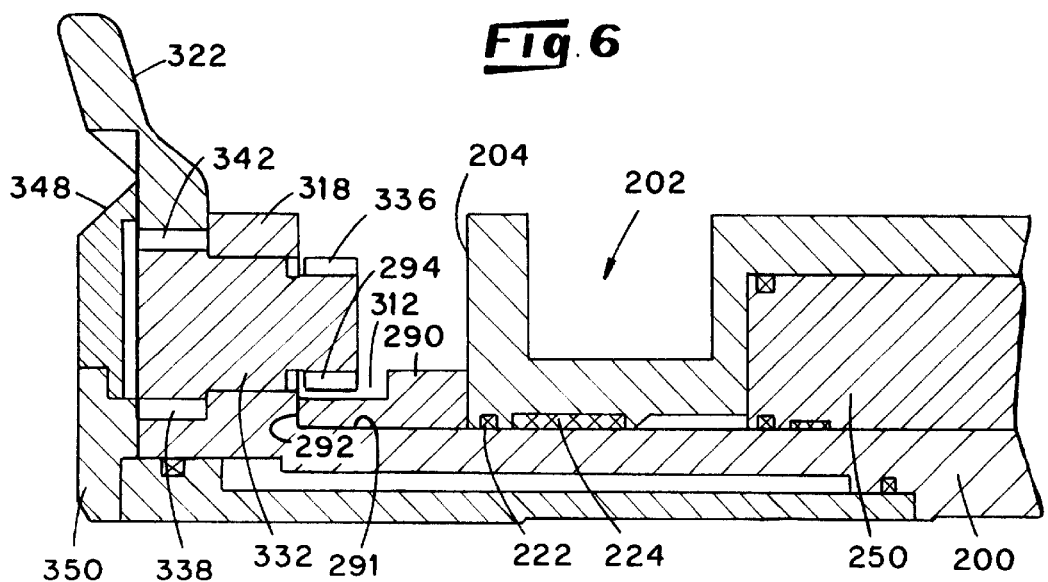
FIG. 7 is a partial sectional view of the belt and tread drum of FIG. 1 and taken generally along the line 6—6 of FIG. 1.

It is to be recalled that the hub is fixed against rotation thereof relative to the longitudinal (rotational) axis of the drum. As depicted in FIGS. 5–7 and 30–33, the present inventor provides a locking ring gear 290 in encircling relationship to the hub at a location adjacent the circumferential inboard face 291 of the hub. This ring gear 190 includes an outboard face 292 which faces and slidably engages the outboard face 291 of the hub. As will be noted these faces may be moved into frictional engagement such that the locking gear is prevented from rotating relative to the hub. The outer circumference of the locking ring gear 290 is provided with gear teeth 294. As seen in FIG. 30, the inboard surface 296 of the locking ring gear is further provided with an outwardly opening elongated arcuate notch 298. As seen in FIGS. 6, 21 and 33, the outboard end 300 of the actuator is provided with a post 302 which projects from the end of the actuator and is received in the elongated notch 298 in the locking ring gear. Thus, when the locking gear ring is fixed relative to the hub, the post 302 can only move within the limits of the length of the notch 298. More specifically, since the post 302 can not move past an end, (end 304, for example) of the notch, the inventor further provides for adjustment of the angular position of such end 304 of the notch 298 so that the rotation of the actuator is halted at a selected angular position of the actuator. In the present embodiment, the movement of the piston to its most retracted position within the cavity 254 provides a well-defined first limit of travel of the piston, hence a well-defined limit of rotation of the actuator. This first limit of rotation of the actuator establishes the minimum retraction limit of the segments. That end 304 of the notch 298 which is employed as a "stop" limit for the rotation of the actuator therefore functions as the selectable maximum limit of expansion of the segments, hence the desired diameter of the drum for the manufacture of a given size belt and tread package (tire).

To selectively alter the angular position of the end 304 of the notch 298, relative to the post 302 on the actuator, the present inventor includes means for selective interlocking of the locking ring gear 290 with the stationary hub. In the depicted embodiment, this means includes the inboard face 291 provided on the end 293 of the hub, this face 291 extending circumferentially around the end of the hub. As discussed hereinabove, the locking ring gear includes an outboard face 292 that extends circumferentially about the ring gear. At least one locking lug 306, depicted separately in FIGS. 34 and 35, is provided at a location about the circumference of the locking ring gear and in position to selective urge the locking ring gear laterally toward or away from the hub, hence to cause engagement or disengagement of the faces 291 and 292. This locking lug 306 includes an arcuate shoulder portion 310 that is adapted to be slidably received in an outwardly opening circumferential groove 312 provided in the outer circumference of the locking ring gear, inboard of the teeth 294 of the gear. By this means, the locking ring gear, when unlocked, can be rotated relative to the hub. As depicted, the locking lug 306 is threadably received on the inboard end 314 of a shaft 316 which is rotatably mounted in, and projects through, a flange portion 318 on the end 293 of the hub to extend outwardly from the locking lug 306 to the exterior of the shell 20. The outboard end 320 of the shaft 316 is provided with a locking handle 322 whose rotation functions to move the locking lug laterally, hence between its locked and unlocked positions with respect to the locking ring gear.

Rotation of the locking ring gear 290, when it is unlocked from the hub, is provided for by means of a circular hand wheel 330 (see FIGS. 38–40) that is rotatably mounted on the end 15 of the drum by means of a plurality of translation gears 332 (see FIGS. 36, 37) disposed in angularly spaced apart locations on the end of the drum. Each translation gear is mounted in, and extends through, the flange 318 on the end 293 of the hub. Each translation gear is provided on its inboard end 334 with a first set of gear teeth 336. These gear teeth 336 are so disposed with respect to the locking ring gear that the teeth 294 on the outer circumference of the locking ring gear mesh with this first set of gear teeth 336. Each translation gear is further provided with a second set of gear teeth 338 on its outboard end 340. The hand wheel 330 is provided with a set of gear teeth 342 on the inner circumference thereof, which latter gear teeth mesh with the gear teeth 338 on the outboard end of each of the translation gears. By this means, rotation of the hand wheel can effect counter rotation of the locking ring gear when the latter is disengaged from the hub. At such time as the hand wheel is in its desired angular position, rotation of the locking handle 322 associated with each translation gear serves to lock the locking ring gear to the hub and prevent any rotational movement of the locking ring gear until such time as it is again released from the hub.

Figures 43, 44:
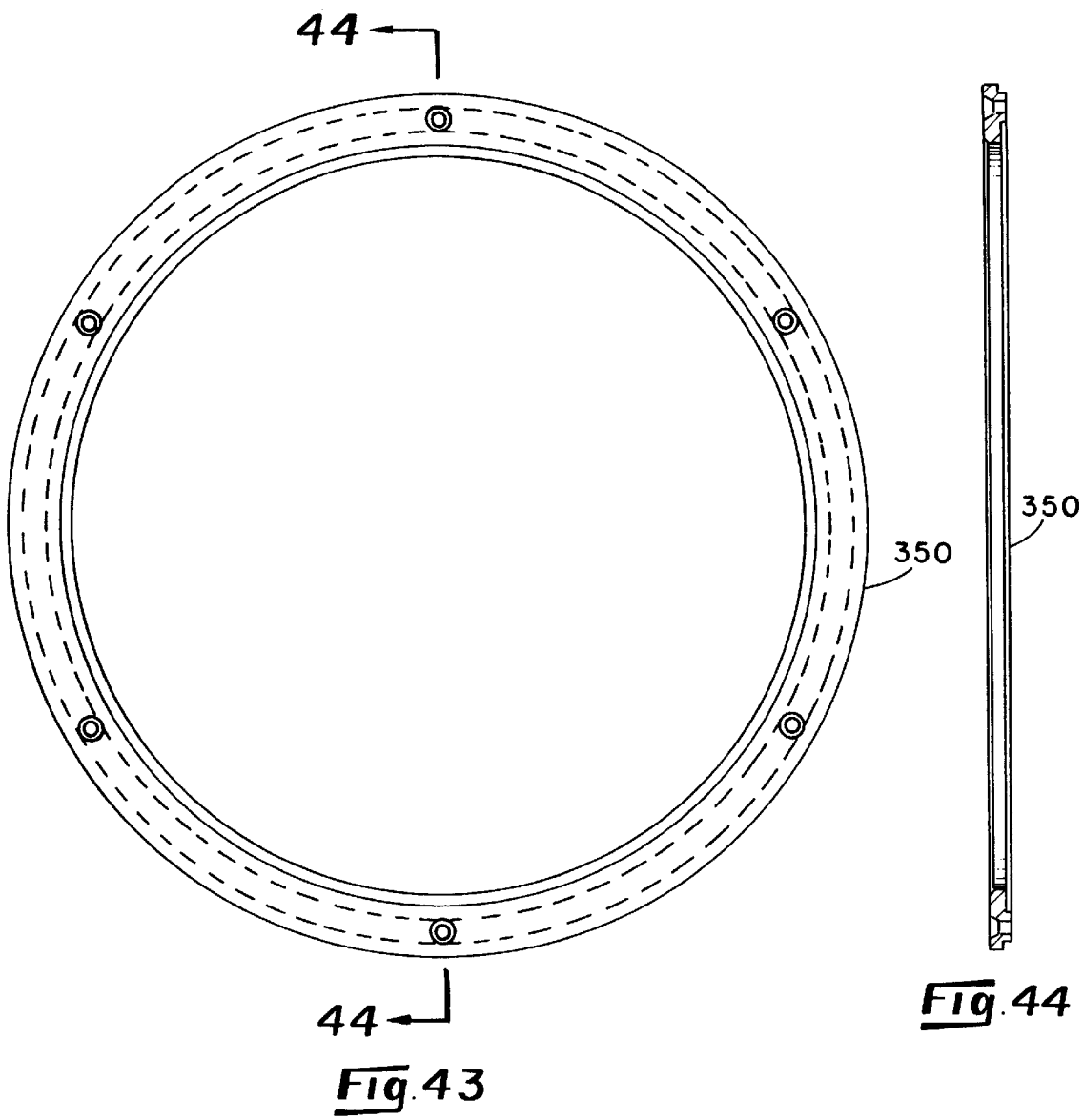
FIG. 43 is a plan view of a scale lock ring as employed in the present invention.
FIG. 44 is a sectional view of the scale lock ring depicted in FIG. 43 and taken generally along the line 44—44 of FIG. 43.

The outboard face 344 of the hand wheel is provided with an alignment indicator 346. A scale ring 348 (see FIGS. 41, 42) is mounted outboard of the hand wheel 330 as by means of a retention ring 350 (see FIGS. 43, 44) that overlies a portion of the inner margin 352 of the scale ring and is fixed to the end 293 of the hub as by screws 354. The scale ring is provided with indicia 356 on its outboard face 358 and about a portion of its circumference, such indicia being disposed in cooperating relationship to the alignment indicator on the hand wheel. This indicia is calibrated to visually indicate units of measure of the diameter of the drum. Thus, alignment of the alignment indicator on the hand wheel to a given drum diameter indication on the scale functions to rotate the several translation gears, hence rotate the locking ring gear, hence select the angular position of the end 304 of the notch 298 in the ring gear, hence select the limit of rotation of the actuator in a direction which causes radial expansion of the segments, so that upon the actuation of the piston in the cavity to move the piston away from its retracted position toward its extended position, the actuator is rotated only until the post 302 on the actuator engages the end 304 of the notch. Thereupon the rotation of the actuator is halted, hence the movement of the piston 250 is halted. To maintain the segments expanded to their selected maximum positions, pressurized fluid is maintained in the cavity 252 to hold the piston against movement thereof toward its retracted position, under the influence of the spring means 276, until such time as the belt and tread package has been formed and is ready to be removed from the drum. Thereupon, the pressurized fluid is released from the cavity and the piston returns to its retracted position within the cavity under the influence of the spring means. Notably, the arcuate length of the notch 298 is selected such that the post 302 never engages the end 305 of the notch so that the length of the notch is not a factor in determining the movement of the piston toward its fully retracted position. On the other hand, the length of the helical groove 360 in the outer circumference of the hub is selected such that its opposite ends 283 and 362 establish the maximum and minimum limits of travel of the piston within the cavity 252. By these means, the maximum and minimum diameters attainable for the drum are mechanically fixed and are primarily a function of the available space within which the several pairs of links can be fitted, which space determines the permissible length of the links and the permissible arcuate spacing of their radially inward ends.

The foregoing detailed description of the drum 12 is for the purpose of illustration and not limitation. It should be recognized that a belt and tread drum embodying features of the present invention could be made with numerous modifications, substitutions, deletions and additions without departing from the scope of the claims as set forth hereinafter.

What is claimed:

1. A belt and tread drum for use in the manufacture of vehicle tires including a generally cylindrical core having an axis of rotation and adapted to be mounted for rotation thereof comprising means defining an outer shell disposed in circumscribing relationship to the core and rotatable therewith, said means including a plurality of segments, each of which includes a radially outer arcuate surface such that the collective arcuate surfaces of said segments defines an outer circumference of the drum for the formation of a belt and tread package thereon, means for selectively positioning said segments radially of the axis of rotation of the drum, said means including a plurality of sets of links, each set of links including a first link having first and second opposite ends and a second link having first and second opposite ends, a plurality of carrier means for mounting of respective ones of said segments on respective ones of said carriers, hub means of generally cylindrical geometry fixedly mounted on said core for rotation therewith, actuator means of generally cylindrical geometry disposed in circumscribing relationship with said hub means and defining therebetween a cylindrical cavity, said actuator means being rotatable with respect to said hub means, piston means disposed within said cylindrical cavity for reciprocation therein between retracted and extended positions, pressurized fluid means for urging said piston means away from its retracted position and toward its extended position, means for restricting rotational movement of said piston means relative to said actuator means, means for effecting rotational movement of said actuator relative to said hub in response to movement of said piston between its retracted and extended positions, said first end of said first link and said first end of said second link of each set of links being pivotally mounted to a respective one of said carriers, said second end of said first link being pivotally mounted to said actuator, and said second end of said second link being pivotally mounted to said hub such that rotation of said actuator relative to said hub results in an increase or decrease in the arcuate spatial separation of said second end of said first link and said second end of said second link and resultant radial movement of said carriers and their respective segments, and means for selectively limiting the extent of movement of said piston within said cavity between its retracted and extended positions.

2. The belt and tread drum of claim 1 and including at least two sets of links associated with each of said segments.

3. The belt and tread drum of claim 1 and including means for urging said piston means away from its extended position and toward its retracted position.

4. The belt and tread drum of claim 1 wherein said means for effecting rotational movement of said actuator relative to said hub in response to movement of said piston between its retracted and extended positions includes a helical groove defined in the outer circumferential surface of said hub and follower means projecting from said piston in position to be received within said helical groove.

5. The belt and tread drum of claim 1 wherein said means for restricting rotational movement of said piston means relative to said actuator means comprises a straight groove defined in and opening outwardly from the outer circumferential surface of said piston and follower means projecting from said actuator in position to be received within said groove.

6. The belt and tread drum of claim 1 wherein said means for selectively limiting the extent of movement of said piston within said cavity away from its retracted position and toward its extended position includes a locking ring gear disposed between said actuator and hub, said ring gear including an elongated arcuate notch defined therein on a surface thereof facing said actuator, and means projecting from said actuator to be received within said notch.

7. The belt and tread drum of claim 6 and including means for selectively locking said locking ring gear to said hub.

8. The belt and tread drum of claim 7 and including hand wheel means mounted on said drum and translation gear means interposed between said hand wheel means and said locking ring gear for effecting rotation of said locking ring gear in response to rotation of said hand wheel to select the arcuate position of said notch.

9. The belt and tread drum of claim 8 and including a scale ring fixedly mounted to said hub and including indicia which is visible externally of said drum, said scale ring being disposed contiguous to said hand wheel means for providing a visual indication of the arcuate position of said notch on said locking ring gear.

10. The belt and tread drum of claim 9 wherein said indicia are in the form of graduations indicative of the currently existing diameter of said drum.

11. The belt and tread drum of claim 1 wherein said first end of said first link and said first end of said second link of each set of links are pivotally mounted on a common pivot axis.

12. A method for selectively adjusting the diameter of a belt and tread drum having a plurality of radially positionable segments that define an outer cylindrical surface of the drum, without disassembly of the drum, the drum including an axis of rotation and a generally cylindrical core which is rotatable about the axis of rotation of the drum and wherein the drum includes a cylindrical cavity defined concentrically of and between a generally cylindrical hub disposed centrally of the drum and a generally cylindrical actuator linked by link sets to carriers for the segments for movement of the carriers and their respective segments radially of the drum, each of the link sets including a first link having first and second opposite ends and a second link having first and second opposite ends, the first end of the first link and the first end of the second link of each set of links being pivotally mounted to a respective carrier and a second end of the first link of each set of links being pivotally mounted to the actuator and a second end of the second link of each set of links being pivotally mounted to the hub, the cavity housing a piston moveable between retracted and extended positions within the cylindrical cavity, comprising the steps of moving said piston means between its retracted and extended positions while restraining said piston against rotational movement with respect to said actuator, converting linear movement of said piston within said cavity to rotational movement of said actuator relative to said hub thereby altering the arcuate separation of said second ends of said first and second links of each set of links to change the radial positions of said carriers and said segments.

* * * * *